United States Patent
Tsubota (10) Patent No.: US 7,287,061 B2
(45) Date of Patent: Oct. 23, 2007

(54) DATA TRANSFER APPARATUS AND DATA TRANSFER METHOD

(75) Inventor: Keisuke Tsubota, Tokyo (JP)

(73) Assignee: NEC Corporation, Tokyo (JP)

( * ) Notice: Subject to any disclaimer, the term of this patent is extended or adjusted under 35 U.S.C. 154(b) by 729 days.

(21) Appl. No.: 10/219,256

(22) Filed: Aug. 16, 2002

(65) Prior Publication Data
US 2003/0086424 A1    May 8, 2003

(30) Foreign Application Priority Data
Aug. 22, 2001  (JP)  ............................. 2001-252046

(51) Int. Cl.
*G06F 15/16*  (2006.01)
(52) U.S. Cl. ................... 709/207; 709/200; 709/250
(58) Field of Classification Search ............... 709/203, 709/238, 230, 250, 226, 228, 232; 370/389, 370/392
See application file for complete search history.

(56) References Cited

U.S. PATENT DOCUMENTS

| | | | |
|---|---|---|---|
| 5,128,932 A * | 7/1992 | Li .............................. | 370/236 |
| 5,487,172 A * | 1/1996 | Hyatt .......................... | 712/32 |
| 5,925,097 A * | 7/1999 | Gopinath et al. ........... | 709/200 |
| 5,991,817 A * | 11/1999 | Rowett et al. .............. | 709/250 |
| 6,167,041 A * | 12/2000 | Afanador .................... | 370/353 |
| 6,212,164 B1 * | 4/2001 | Murakami et al. .......... | 370/230 |
| 6,240,458 B1 * | 5/2001 | Gilbertson .................. | 709/232 |
| 6,279,050 B1 | 8/2001 | Chilton et al. | |
| 6,400,715 B1 * | 6/2002 | Beaudoin et al. ........... | 370/392 |
| 6,434,620 B1 * | 8/2002 | Boucher et al. ............ | 709/230 |
| 6,570,875 B1 * | 5/2003 | Hegde ......................... | 370/389 |
| 6,845,100 B1 * | 1/2005 | Rinne .................... | 370/395.43 |
| 7,010,607 B1 * | 3/2006 | Bunton ....................... | 709/228 |
| 2002/0091826 A1 * | 7/2002 | Comeau et al. ............. | 709/226 |
| 2004/0003126 A1 * | 1/2004 | Boucher et al. ............ | 709/250 |

(Continued)

FOREIGN PATENT DOCUMENTS

| | | |
|---|---|---|
| GB | 2224419 | 5/1990 |
| GB | 2324678 | 10/1998 |

(Continued)

OTHER PUBLICATIONS

Quality-of-Service in Packet Networks Basic Mechanisms and..—Guérin, Peris (1999) www.seas.upenn.edu/~guerin/publications/qos.ps.gz.*
Theory and Practice in Parallel Job Scheduling—Feitelson, Rudolph.. (1994) www.cs.huji.ac.il/~feit/parsched/p-97-1.ps.gz.*
Internet Engineering Task Force IPTEL WG—Internet-Draft Lennox Schulzrinne www.cs.columbia.edu/~lennox/draft-ietf-iptel-cpl-requirements-00.*

(Continued)

*Primary Examiner*—Thong Vu
(74) *Attorney, Agent, or Firm*—Young & Thompson (57) ABSTRACT

A forwarding table 7 where a next transmission queue is registered is sequentially transferred within a queue chain 30 as a group of queues 131. If a priority of a queue to which the forwarding table 7 is transferred is higher than that of a queue registered in the forwarding table 7 as a next transmission queue, a next transmission queue number or the like is updated. Further, an arbiter 8 outputs a transmission command to a queue registered as the next transmission queue in the forwarding table 7 which has been transferred through all the queues, to transmit the next data frame from the queue having the highest priority. By this arrangement, it is possible to determine data frame transmission priorities among plural queues easily and efficiently while insuring a minimum guaranteed rate defined in each queue.

10 Claims, 11 Drawing Sheets

U.S. PATENT DOCUMENTS

| | | | |
|---|---|---|---|
| 2004/0030745 A1* | 2/2004 | Boucher et al. | 709/203 |
| 2004/0100952 A1* | 5/2004 | Boucher et al. | 370/389 |
| 2005/0160139 A1* | 7/2005 | Boucher et al. | 709/203 |
| 2005/0185651 A1* | 8/2005 | Rinne | 370/395.1 |
| 2005/0204058 A1* | 9/2005 | Philbrick et al. | 709/238 |
| 2005/0278459 A1* | 12/2005 | Boucher et al. | 709/250 |

FOREIGN PATENT DOCUMENTS

| | | |
|---|---|---|
| GB | 2342810 | 4/2000 |
| JP | 6-338905 | 12/1994 |
| JP | 10-84346 | 3/1998 |
| JP | 11-317743 | 11/1999 |
| WO | WO 97/13353 | 4/1997 |

OTHER PUBLICATIONS

Performance of PLAYTHROUGH rings with mixed types of traffic Ghafir, H.M.; Silio, C.B., Jr.; Local Computer Networks, 1989., Proceedings 14th Conference on Oct. 10-12, 1989 pp. 426-434.*

Using system state information for adaptive state polling policy in distributed load balancing Gil-Haeng Lee; Parallel Algorithms/ Architecture Synthesis, 1997. Proceedings. Second Aizu International Symposium Mar. 17-21, 1997 pp. 166-173.*

Practical use of Ada 95's concurrency features Carter, J.R.; Sanden, B.I.; Concurrency, IEEE [see also IEEE Parallel & Distributed Technology] vol. 6, Issue 4, Oct.-Dec. 1998 pp. 47-56.* www.techweb.com/encyclopedia (2 pages).

* cited by examiner

FIRST TABLE ( TRANSMISSION TABLE )

| SLOT NUMBER | SCHEDULER GROUP NUMBER | MINIMUM GUARANTEED RATE RESERVED QUEUE NUMBER |
|---|---|---|
| 1 | x | x x x |
| 2 | 0 ( = UNUSED ) | 0 |
| . . . | | |
| N | y | 0 ( = NO ALLOCATION OF MINIMUM GUARANTEED RATE RESERVE QUEUE ) |

Fig. 7

SECOND TABLE ( SCHEDULER TABLE )

| SCHEDULER GROUP NUMBER | FINAL TRANSMISSION QUEUE NUMBER (PRIORITY 1) | FINAL TRANSMISSION QUEUE NUMBER (PRIORITY 2) | . . . | FINAL TRANSMISSION QUEUE NUMBER (PRIORITY P) |
|---|---|---|---|---|
| 1 | x x x | x x x | | x x x |
| 2 | x x x | x x x | | x x x |
| . . . | | | | |
| M | x x x | x x x | | x x x |

Fig. 8

FORWARDING TABLE

| SCHEDULER GROUP NUMBER | MINIMUM GUARANTEED RATE RESERVED QUEUE NUMBER | FINAL TRANSMISSION QUEUE NUMBER (PRIORITY 1) | FINAL TRANSMISSION QUEUE NUMBER (PRIORITY 2) | ... | FINAL TRANSMISSION QUEUE NUMBER (PRIORITY P) | NEXT TRANSMISSION PRIORITY NUMBER | NEXT TRANSMISSION QUEUE NUMBER |
|---|---|---|---|---|---|---|---|

Fig. 9

QUEUE INFORMATION TABLE

| SCHEDULER GROUP NUMBER | PRIORITY NUMBER | QUEUE NUMBER | MAXIMUM TRANSMISSION RATE | TRANSMISSION POSSIBLE / IMPOSSIBLE FLAG (1/0) |
|---|---|---|---|---|

DATA TRANSFER APPARATUS AND DATA TRANSFER METHOD

BACKGROUND OF THE INVENTION

1. Field of the Invention

The present invention relates to a data transfer technique in communication apparatuses and the like, and more particularly, to data transfer apparatus and data transfer method for determining transmission priorities of data frames transmitted from plural queues.

2. Description of Related Art

First, a general construction of data exchange unit utilized in ATM communication or the like will be described with reference to FIG. 11.

Figure 11:
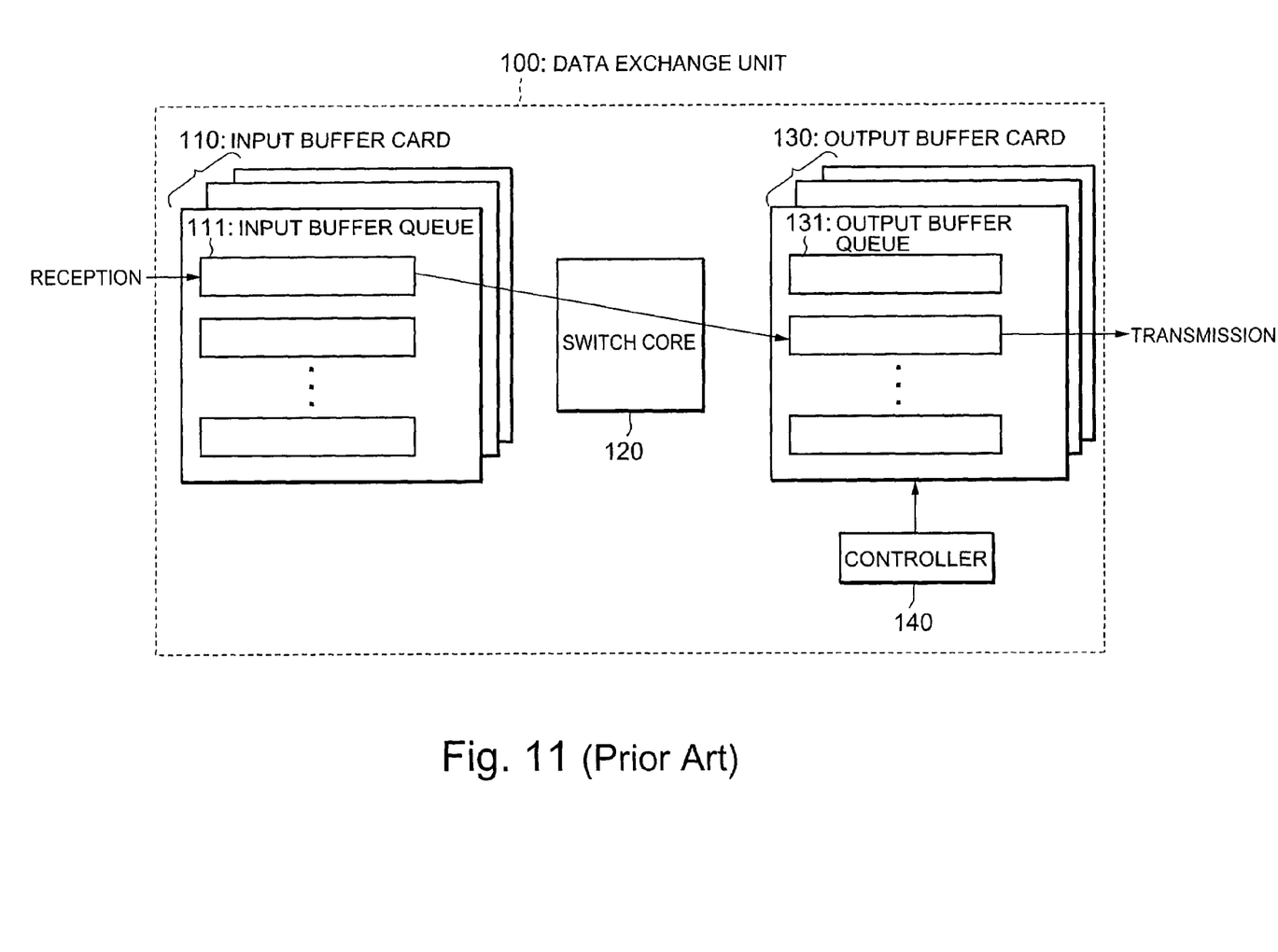
FIG. 11 is an explanatory diagram showing the structure of a conventional data exchange unit.

As shown in FIG. 11, a data exchange unit 100 comprises plural input buffer cards 110, a switch core 120 and plural output buffer cards 130.

A data frame received by the data exchange unit 100 is passed through an input buffer queue 111 of the input buffer card 110, then switched by the switch core 120, and sent to any one of the output buffer cards 130. Each output buffer card 130 has plural output buffer queues (hereinbelow simply referred to as "queues") 131. The data frame sent to the output buffer card 130 is allocated to any one of the queues 131 in correspondence with its characteristic.

In each queue 131, data frame transmission conditions such as a minimum guaranteed rate and a priority are determined. Accordingly, the data frame is subjected to transmission rate control (shaping) under these conditions, and transmitted from the data exchange unit 100.

A controller 140 performs control for efficient data frame shaping while insuring the minimum guaranteed rates and priorities of the respective queues. For example, the controller 140 performs 2-step shaping on data frames stored in the plural queues 131, and defines the minimum guaranteed rates and the priorities for the respective queues.

Next, the 2-step shaping will be briefly described with reference to FIG. 12.

Figure 12:
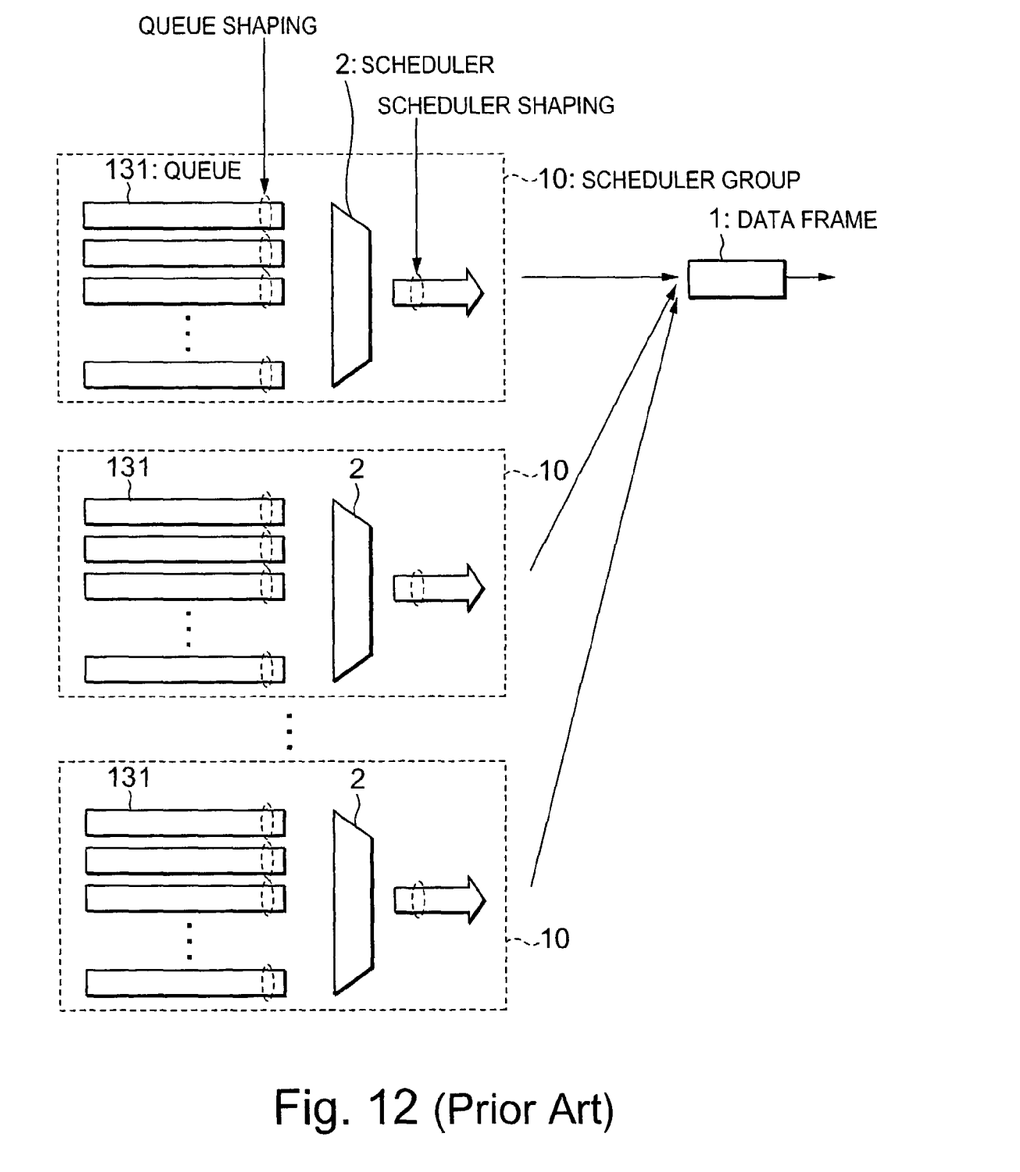
FIG. 12 is an explanatory diagram showing the conventional 2-step shaping processing.

As shown in FIG. 12, data frames stored in the queues are first subjected to shaping (hereinbelow referred to as "queue shaping") in the respective queues. The queue shaping means processing of limiting data frame transmission if the transmission rate of data frame is higher than the maximum transmission rate (shaping rate) set for the queue.

Figure 13:
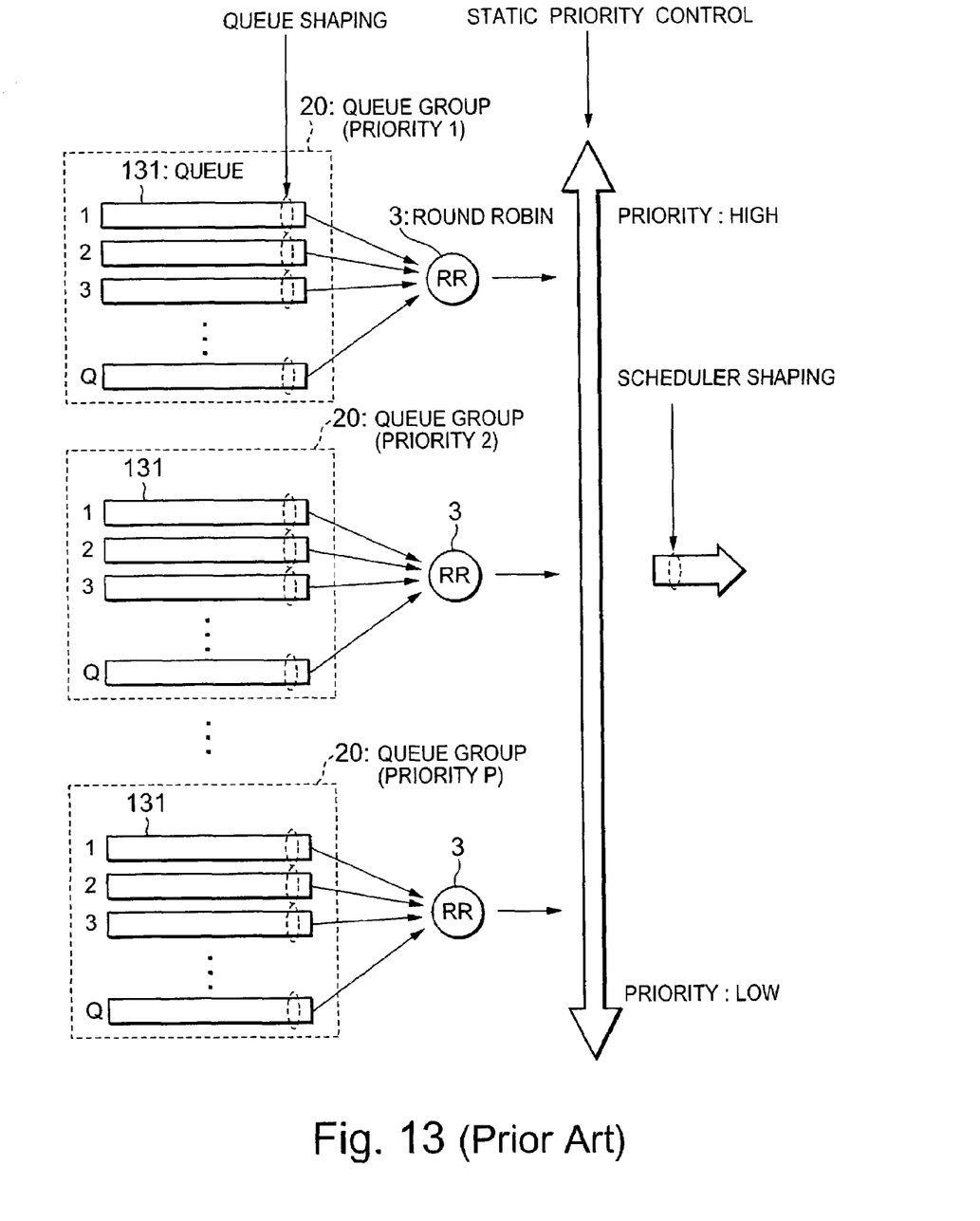
FIG. 13 is an explanatory diagram showing the scheduler shaping processing in FIG. 12.

Next, a rate control circuit (scheduler) again performs shaping (hereinbelow referred to as "scheduler shaping") on the data frame with the data frames in the other queues. Note that a part subjected to the scheduler shaping by the same scheduler is referred to as a "scheduler group" 10. FIG. 13 shows an enlarged view of the scheduler group 10.

The queues included in each scheduler group 10 are divided into plural groups (hereinbelow referred to as "queue groups") 20 in accordance with priority. A round robin 3 is provided for each queue group 20. The round robin 3 determines a queue from which a data frame is to be transmitted next in each queue group 20. Note that upon determination of queue, it is necessary to insure the minimum guaranteed rates defined for the respective queues and determine priorities of data frame transmission among the respective queues.

The priority of data frame 1 transmitted from the respective queue groups 20 is determined by static priority control, and the data frame is subjected to the scheduler shaping.

However, in the above-described conventional 2-step shaping, the following three problems occur upon determination of priorities of data frame transmission among the respective queues 131.

The first problem is that it is necessary to reconstruct a queue group to which each round robin belongs in correspondence with change of combination of traffic shaping, and processing is complicated.

The second problem is that if the minimum guaranteed rate and priority are set for each queue 131, it is necessary to prepare a queue corresponding to the settings or a queue having all the settings for selection of function. In this case, processing is also complicated.

Further, the third problem is that in the conventional circuit, in a case where the minimum guaranteed rate and priority can be set for each queue and round robin, the circuit scale increases. Thus the number of queues cannot be increased without difficulty.

SUMMARY OF THE INVENTION

The present invention has its object to provide data transfer apparatus and data transfer method for determining priorities of data frame transmission among plural queues easily and efficiently, while insuring minimum guaranteed rates defined for the respective queues.

The data transfer apparatus according to the present invention is provided with a forwarding table generator that generates a forwarding table in which data for determination of the transmission priorities is registered and which is sequentially transferred to the plural queues;

a data update unit that, if a priority of transmission queue to which the forwarding table has been transferred is higher than that of a next transmission queue registered in the forwarding table as a transmission queue from which a data frame is to be transmitted next, updates the next transmission queue with the transmission queue; and a data arbitration unit that causes transmission of data frame from a queue registered as the next transmission queue in the forwarding table which has been transferred through all the plural queues.

According to the present invention as described above, since all the queues have the same structure regardless of minimum guaranteed rate and priority, the respective queues can accommodate all the traffic.

Further, a function for determining the priorities is realized by an arbiter 8, it is not necessary to provide plural round robin function blocks. Accordingly, it is not necessary to reconstruct a queue group to which each round robin belongs in correspondence with change of queue usage. As a result, processing can be performed easily in correspondence with various combinations of queue usages.

Further, as the priority is determined in pipeline form, algorithms of the respective queues can be simplified. Accordingly, a processing function of determining the priority can be realized by a simple circuit construction.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENT

A preferred embodiment of data transfer apparatus and data transfer method of the present invention will be described in accordance with FIGS. 1 to 12.

Note that priority determination processing in data transfer in the following embodiment is executed by a computer controlled by a program. The program is provided from e.g. a recording medium. As the recording medium, a magnetic disk, a semiconductor memory or other arbitrary computer-readable medium can be used. Further, the program recorded in the recording medium can be read by the computer via a communication line.

The construction of the data transfer apparatus of the present embodiment is basically the same as that of the conventional data exchange unit 100 shown in FIG. 11. The present data transfer apparatus has plural queues (output buffer queues) 131 for temporarily storing data frames. Further, as shown in FIGS. 12 and 13, the queues 131 are divided into M (M is an integer equal to or greater than 2) scheduler groups 10. Further, in each scheduler group 10, the queues 131 are divided into P (P is an integer equal to or greater than 2) subgroups (queue groups) 20 each having queues of the same priority.

The first step of transmission rate control (queue shaping) is performed in the queues 131 in each queue group 20. Then, in each queue group 20, the priorities for transmission of data frame 1 among the queues 131 in the queue group 20 is determined. In this embodiment, serial numbers (1 to Q) are put on the respective queues 131 in the same queue group.

Further, in each queue group 20, static priority is determined, and the second step of transmission rate control (scheduler shaping) is performed by the rate control circuit (scheduler).

Note that in the present embodiment, the function of determining priorities of data frame transmission among the queues 131 is different from the conventional priority determination by the controller 140 in FIG. 11.

Figure 1:
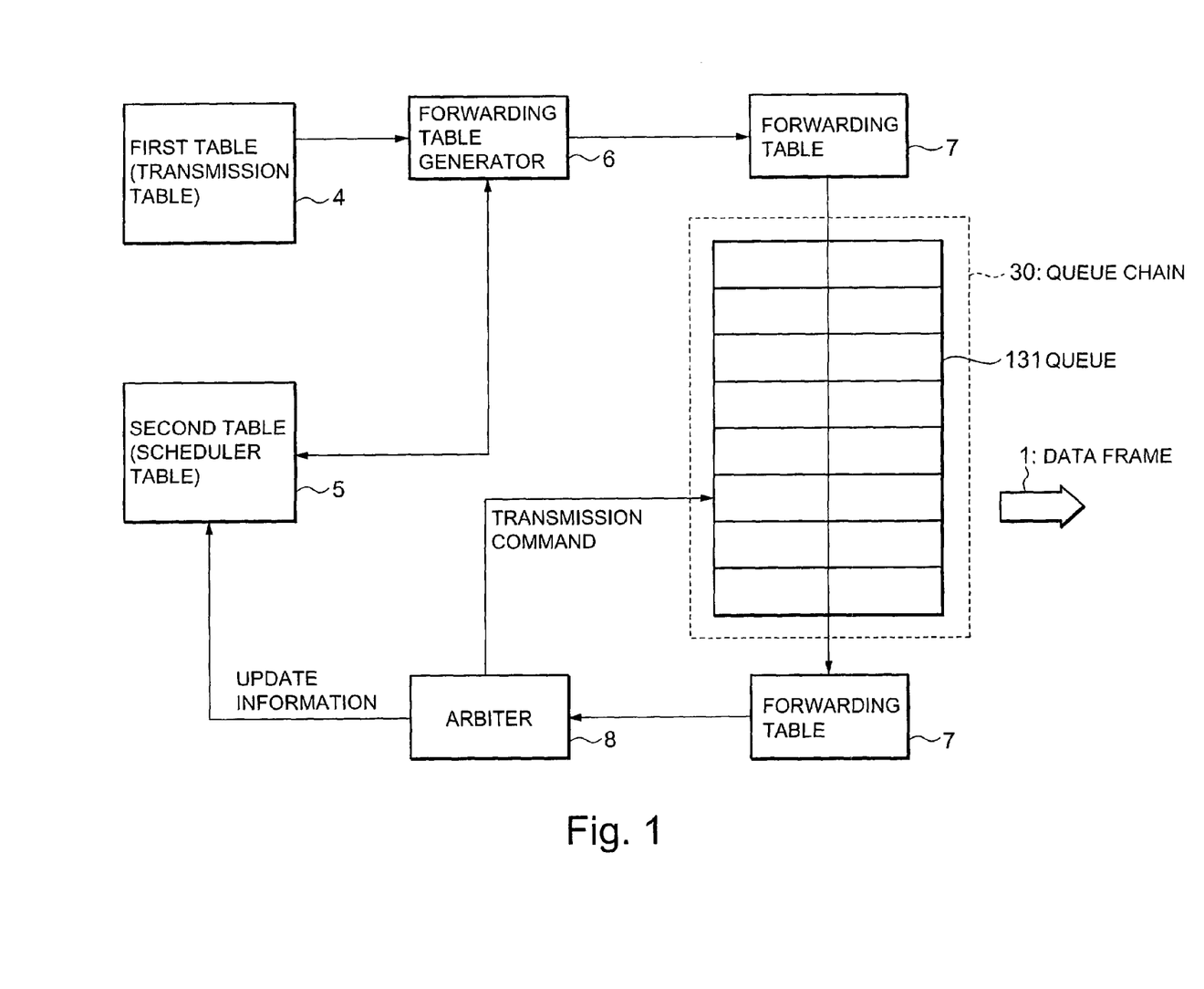
FIG. 1 is a block diagram showing the construction of a controller of a data transfer apparatus according to a first embodiment of the present invention.

First, the priority determination according to the present embodiment will be described with reference to FIG. 1.

In the present embodiment, a forwarding table generator 6 generates a forwarding table 7 for priority determination based on a first table 4 and a second table 5. Note that the particular settings of the first table 4, the second table 5 and the forwarding table 7 will be described later.

First, the contents of the forwarding table 7 are sequentially transferred to the respective queues 131 in the queue chain 30. Before transfer of the forwarding table to the respective queues 131, the following two types of priorities are compared with each other.

The first type of priority is that owned by the queue 131 itself to which the forwarding table 7 is forwarded. The second type of priority is that recorded in the forwarding table 7. If the second type of priority is higher than the first type of priority, the queue for the next transmission (next transmission queue) is updated to the current queue.

Generally, plural forwarding tables 7 are simultaneously transferred to the queue chain 30. For example, in FIG. 2, a forwarding table A is transferred from the n-th queue to the (n+1)th queue, and then a forwarding table B is transferred to the n-th queue. In this case, when the priority of the (n+1)th queue is compared with that in the forwarding table A, the priority of the n-th queue is compared with that in the forwarding table B.

Figure 2:
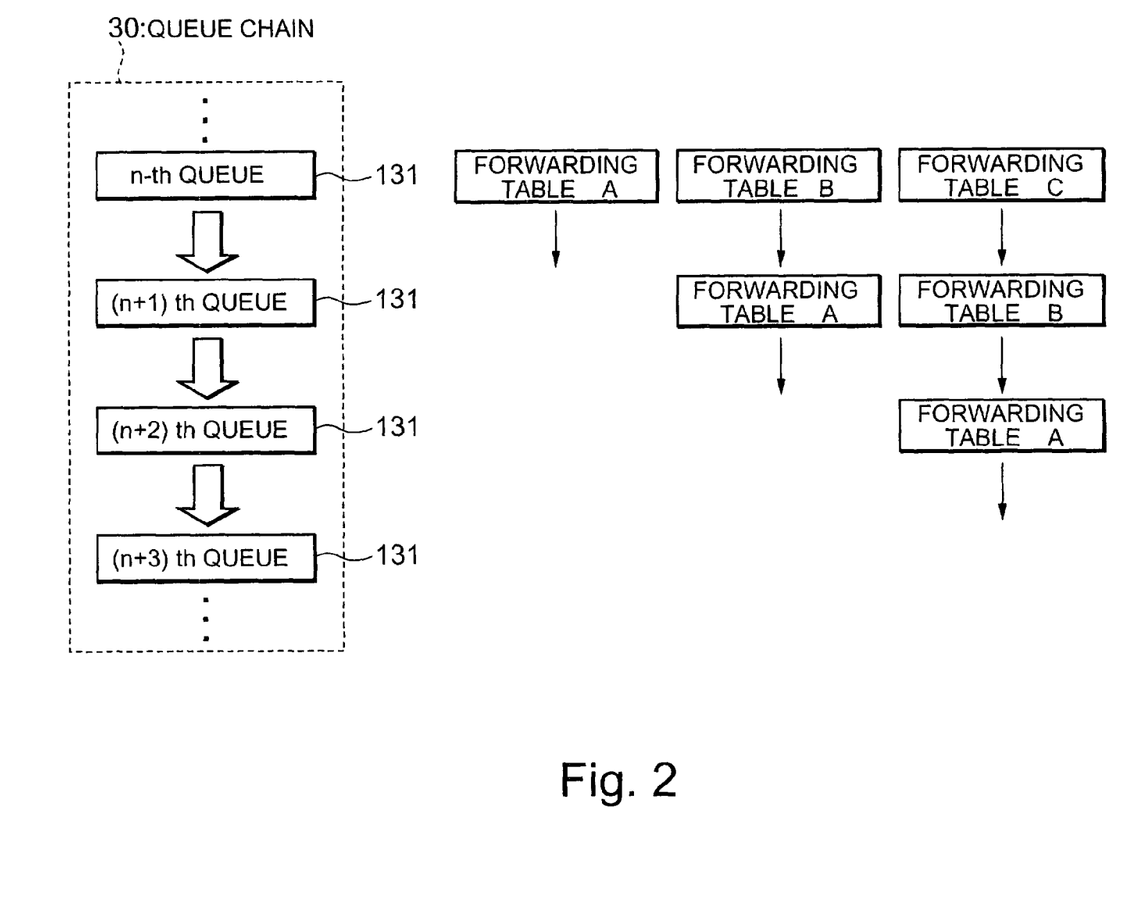
FIG. 2 is an explanatory diagram showing an example of pipeline processing in a queue chain in FIG. 1.

Further, when the forwarding table A is transferred to the (n+2)th queue, the forwarding table B, to the (n+1)th queue, and a forwarding table C, to the n-th queue, the priorities of the (n+2)th queue, the (n+1)th queue and the n-th queue are compared with those in the forwarding tables A, B and C.

Note that in FIG. 2, the priorities are compared with each other simultaneously in adjacent queues, however, the priorities may be compared with each other in plural queues which are not adjacent.

In this manner, as priority comparison is made in pipeline form, the priorities can be determined by processing of combination of simple algorithms for respective queues, and the circuit construction of the respective queues can be simplified.

Then the arbiter 8 refers to the next transmission queue number set in the forwarding table 7 which has been transferred through all the queues. Next, the arbiter 8 outputs a transmission command to a queue having the next transmission queue number for transmission of data frame from the queue. Then the data frame is transmitted from the queue with the highest priority.

Further, as described later, in some cases, the registered contents in the second table must be changed due to transmission of data frame. Accordingly, the arbiter 8 outputs update information to the second table, such that the registered contents in the second table can be updated to those reflecting the latest status.

Next, the priority determination in the data transfer method of the present invention will be described in more detail.

Figure 3:
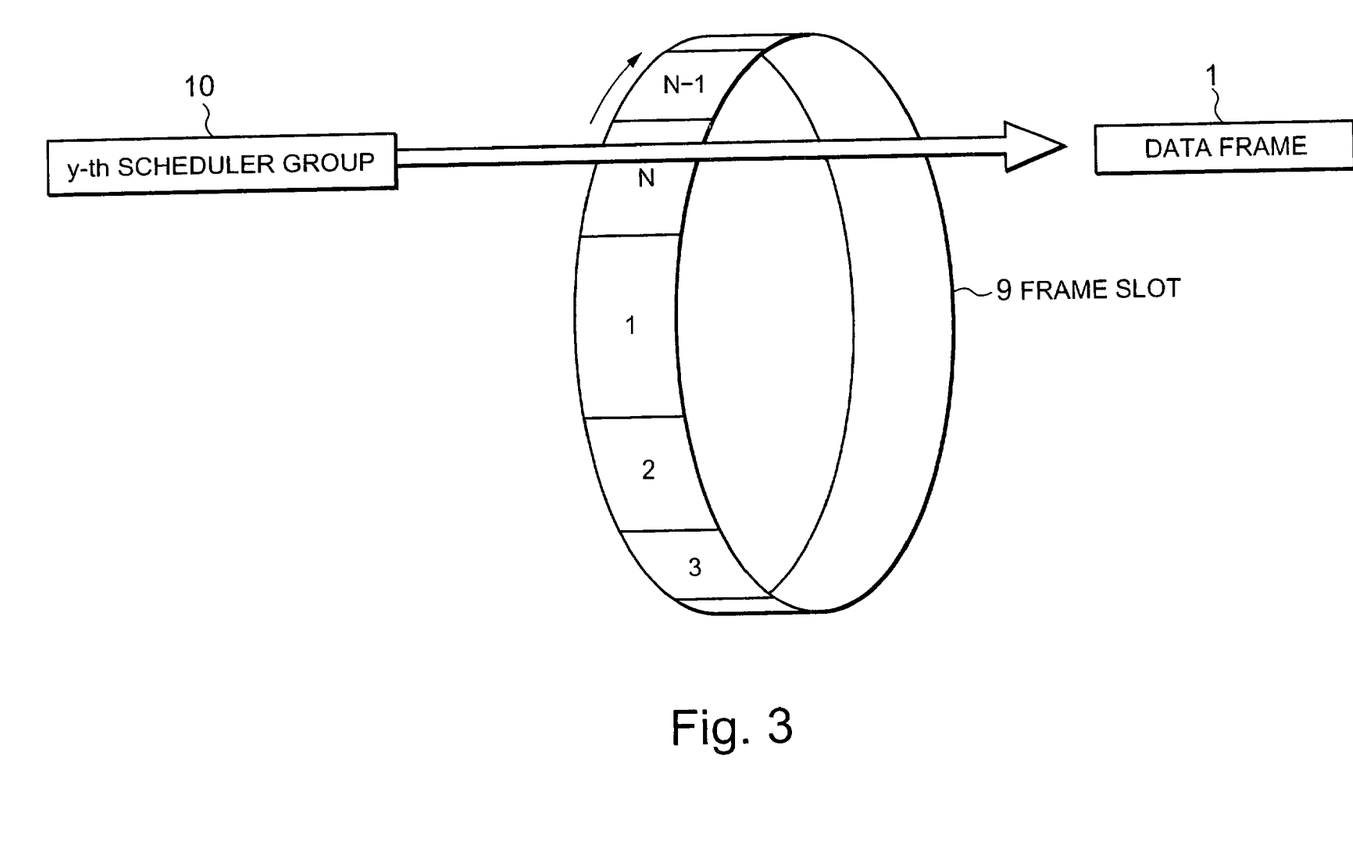
FIG. 3 is an explanatory diagram showing the structure of a frame slot for data frame transmission according to the first embodiment of the present invention.

First, the frame slot 9 shown in FIG. 3 will be described. The frame slot 9 is a loop time slot divided into 1 to N slots for transmission of data frame. The scheduler groups are allocated to a series of slot numbers in correspondence with distribution of shaping rate by scheduler 2 i.e. scheduler group 10. By the allocation, a scheduler group 10 to transmit data frame is designated by each timing of each slot.

Figure 4:
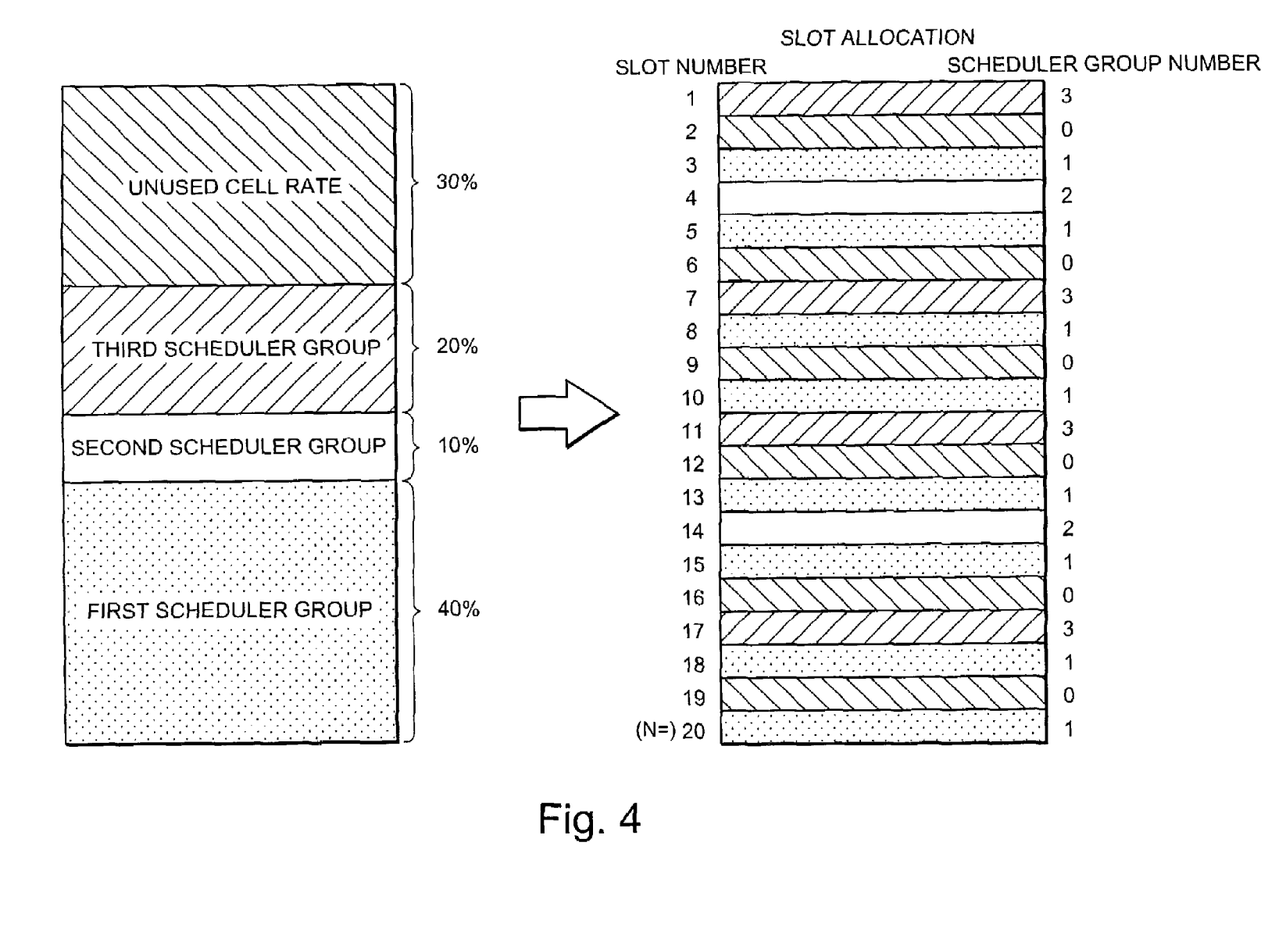
FIG. 4 is an explanatory diagram showing the allocation of schedulers in the frame slot in FIG. 3.

For example, in FIG. 4, the queue group is divided into three scheduler groups 10, and the shaping rates of the first to third scheduler groups 10 are 40%, 10% and 20% of the entire rate, and as the number of slots, N=20 holds.

In this case, the first scheduler group is allocated to eight slot numbers of the series of slot numbers by the above percentage of shaping rate. Further, the second scheduler group is allocated to two slot numbers, and the third scheduler group is allocated to four slot numbers. Note that by the allocation, the numbers of the scheduler groups are allocated to the respective slots as shown in FIG. 4.

Note that unused cell rate "zero" is allocated to the remaining twelve slot numbers of the series of slot numbers. Further, the interval of allocation of the same group on the slot numbers is arbitrarily set by an appropriate algorithm.

Then the forwarding tables 7 are generated one by one in correspondence with the respective slot numbers in the order of slot numbers. Next, when the forwarding table 7 corresponding to the final slot number "N" ("20" in FIG. 4) has been generated, the forwarding table 7 corresponding to the head slot number "1" is generated in a circular manner.

Figure 7:
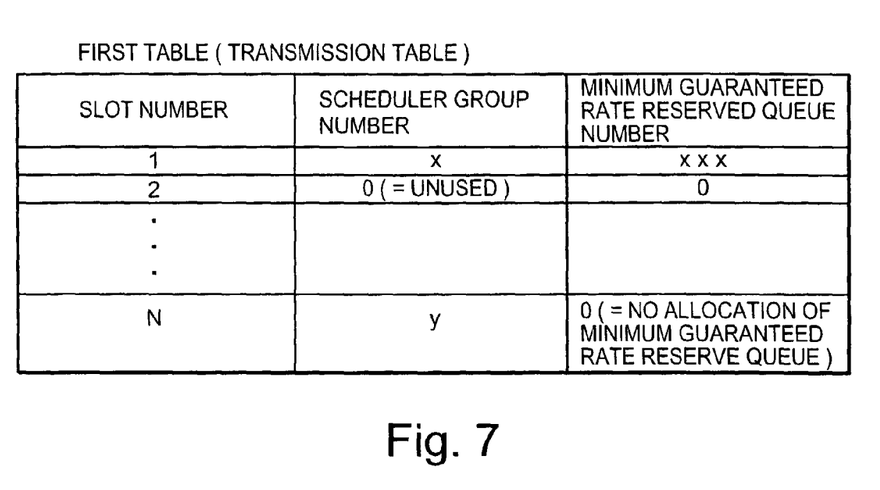
FIG. 7 is an example of contents in a first table in FIG. 1.

In the present embodiment, the numbers of groups allocated to the slot numbers are registered in the first table (transmission table) as shown in FIG. 7.

Further, in the first table, for each slot number, a queue where the minimum guaranteed rate is set in the scheduler group 10 corresponding to each slot number is registered as a minimum guaranteed rate reserved queue number. By this registration, the minimum guaranteed rate can be easily ensured in advance.

For example, in FIG. 7, a scheduler group number "x" is allocated to a slot number "1", and a minimum guaranteed rate reserved queue number "xxx" in the scheduler group "x" is registered. Further, since no scheduler group is allocated to a slot number "2", a value "0" indicative of unused status is registered in the cell of the scheduler group.

Further, a scheduler group "y" is allocated to a slot number "N". As there is no minimum guaranteed rate reserved queue in the scheduler group "y", a value "0" indicative of no allocation of minimum guaranteed rate reserve queue is registered in the cell of the minimum guaranteed rate reserved queue number.

Figure 8:
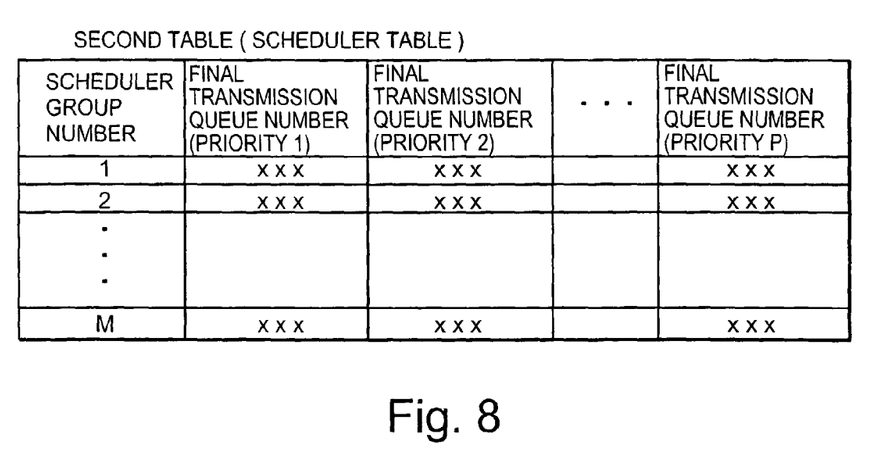
FIG. 8 is an example of contents in a second table in FIG. 1.

Further, in the present embodiment, for each scheduler group 10, the serial number of the final transmission queue among the queues belonging to each queue group 20 is registered in the second table as shown in FIG. 8.

Figure 9:
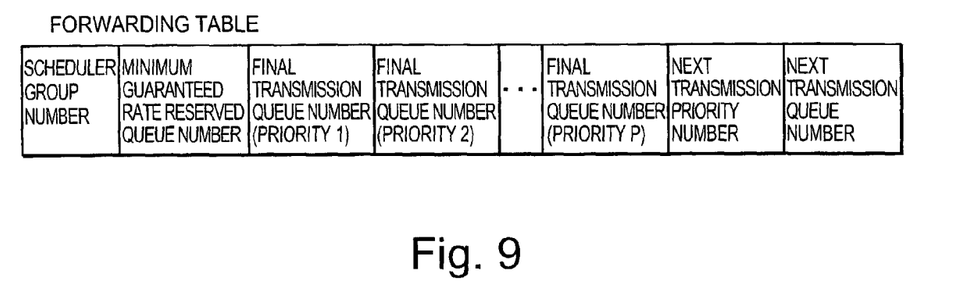
FIG. 9 is an example of contents in a forwarding table in FIG. 1.

Then, the forwarding table generator 6 generates a forwarding table based on information read from the first table and the second table. As shown in FIG. 9, the forwarding table holds a scheduler group number and a minimum guaranteed rate reserved queue number read from the first table and final queue numbers of the respective priorities 1 to P read from the second table in accordance with the scheduler group numbers.

Further, the forwarding table holds a next transmission queue number of the highest priority from which data frame is to be transmitted, and a next transmission priority number indicating the priority of the queue group including the next transmission queue.

Note that at the initial stage where the forwarding table is generated by the forwarding table generator 6, "0" is registered as the next transmission queue number and the next transmission priority. When the forwarding table is transferred sequentially through the queue chain 30, the next transmission priority and the next transmission queue number are updated in the forwarding table.

Figure 10:
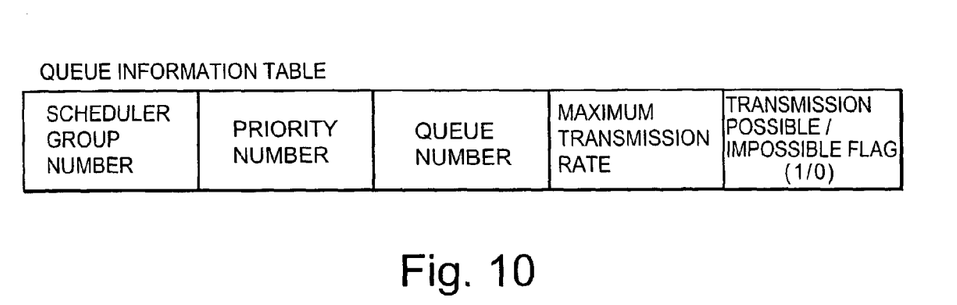
FIG. 10 is an example of contents in a queue information table in FIG. 1.

Further, in the present embodiment, a queue information table is provided for each queue. In the queue information table, the scheduler group number of the queue, the priority of the queue group of the queue, and the queue number as the serial number of the queue are registered.

Further, in the queue information table, a maximum transmission rate and the transmission possible/impossible flag are registered. The maximum transmission rate is set for shaping. If a data frame is transmitted at a rate higher than the maximum transmission rate, the transmission is limited by shaping.

Transmission possible/impossible flag indicates a transmission possible status if a condition (1), a data frame is stored in the queue; and a condition (2) the transmission rate of the data frame is equal to or less than the rate set by the transmission rate control for the queue, are satisfied. In this embodiment, the flag value indicating the transmission possible status is "1".

On the other hand, if one of the conditions (1) and (2) is not satisfied, the transmission possible/impossible flag shows a flag value "0" indicating a transmission impossible status.

In the present embodiment, in each queue where the forwarding table is transferred in pipeline form, the contents of the queue information table are compared with the contents of the forwarding table, and the contents of the forwarding table are updated on predetermined conditions.

Figure 5:
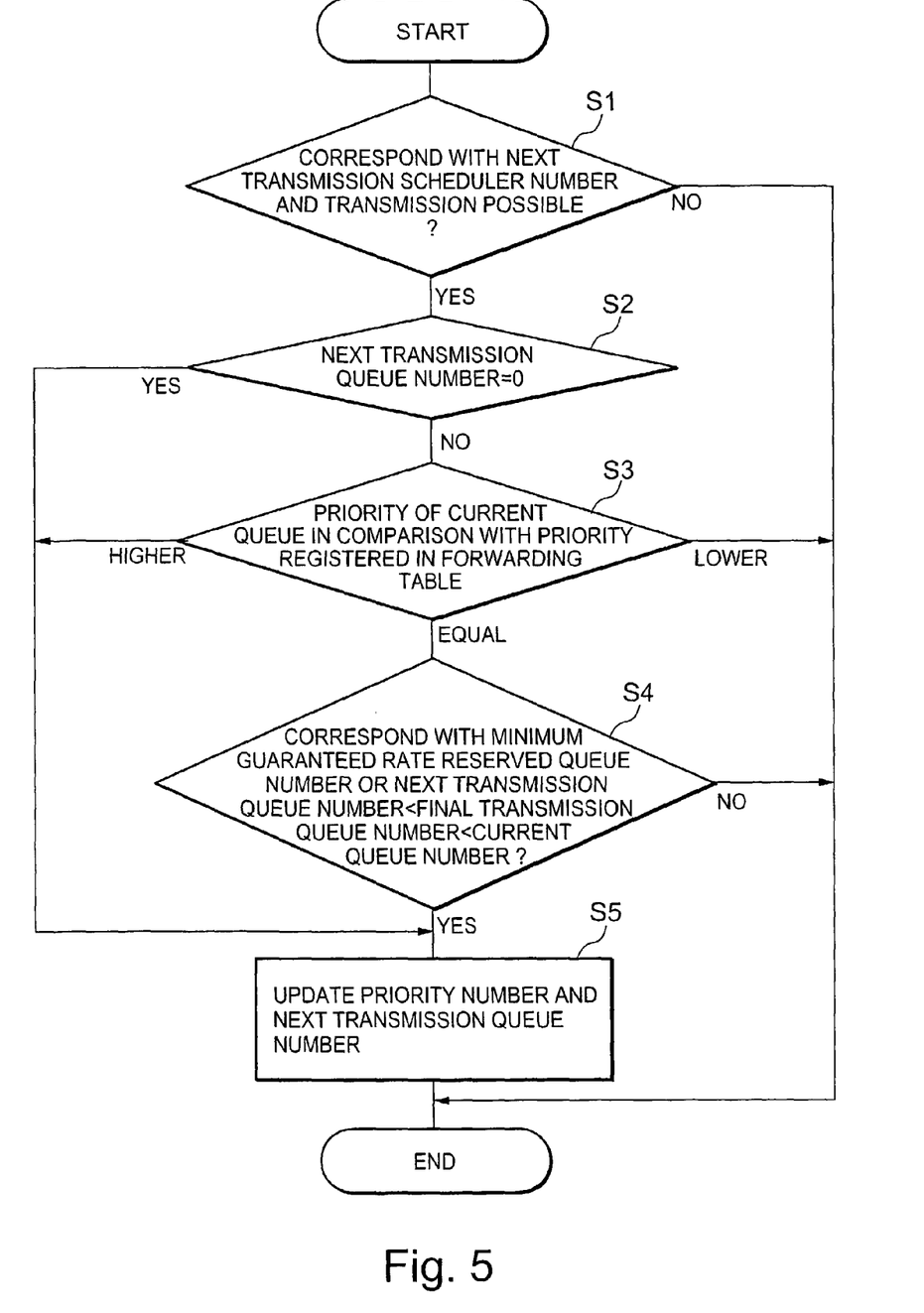
FIG. 5 is a flowchart showing queue processing according to the first embodiment of the present invention.

Next, the processing in each queue will be described with reference to the flowchart of FIG. 5.

First, the queue information table of a queue to which the forwarding table has been transferred is referred to. It is determined whether the scheduler group number registered in the queue information table corresponds with the scheduler group number registered in the forwarding table and whether or not the transmission possible/impossible flag in the queue information table is "1 (transmission possible)" (step S1) If the scheduler group numbers in the queue information table and the forwarding table do not correspond with each other and/or if the value of the transmission possible/impossible flag is "0 (transmission impossible)", processing in the current queue is terminated, and the forwarding table is transferred to the next queue.

On the other hand, if the scheduler group numbers correspond with each other and the value of the transmission possible/impossible flag is "1", it is determined whether or not the next transmission queue number registered in the forwarding table is "0" (step S2).

Then, if the next transmission queue number is "0", the current queue is registered as the next transmission queue, and the priority of the queue group of the current queue is registered (step S5).

On the other hand, if the next transmission queue number is not "0", the next transmission priority registered in the forwarding table is compared with the priority of the queue group of the current queue (step S3).

If the priority of the current queue is lower than the registered priority, the processing for the current queue is terminated, and the forwarding table is transferred to the next queue.

Further, if the priority of the current queue is higher than the registered priority, the next transmission queue number registered in the forwarding table is updated with the queue number in the queue information table, and the registered next transmission priority is updated with the priority of the current queue (step S5).

Further, if the priority registered in the forwarding table and the priority of the current queue are the same, it is determined whether or not the minimum guaranteed rate reserved queue number registered in the forwarding table and the current queue number are the same (condition (3)).

Further, as a condition (4), it is determined whether or not the serial number of the next transmission queue registered in the forwarding table is less than the serial number of the final transmission queue and the serial number of the final transmission queue is less than the serial number of the current queue (step S4).

Next, the above condition (4) will be described with reference to FIGS. 6A and 6B.

Figure 6A:
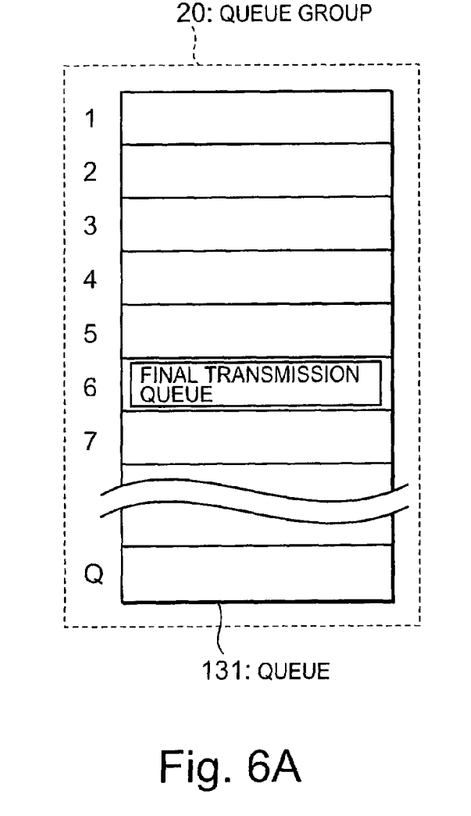
FIGS. 6A and 6B are explanatory diagrams showing round robin priorities according to the first embodiment of the present invention.

As shown in FIG. 6A, in each queue group 20, the serial numbers (1 to Q) are assigned to the respective queues 131 of the queue group. Data frames are sequentially transmitted in the order of serial numbers.

Figure 6B:
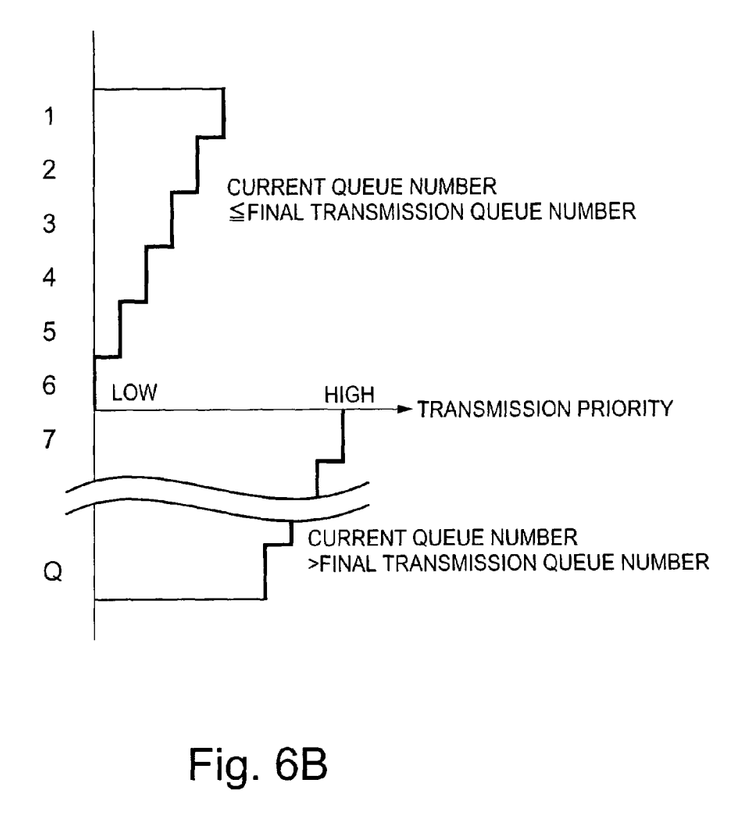

As shown in FIG. 6B, among the queues, a queue next to the final transmission queue has the highest priority, and the priority becomes lower as the serial number of queue increases. The queue with the head serial number follows the queue with the final serial number, and then the priority becomes lower till the final transmission queue. The priority of the final transmission queue is the lowest.

In a case where the current queue number is less than the final transmission queue number (current queue number<final transmission queue number), if a queue a number less than the current queue number is registered as the next transmission queue number in the forwarding table, the priority of the registered queue is always higher than the priority of the current queue. For example, as shown in FIG. 6B, if the current queue number is "4" and the next transmission queue number "1", "2" or "3" is registered in the forwarding table, the priority of the registered queue is always higher than that of the current queue.

In a case where the current queue number is greater than the final transmission queue number (final transmission queue number<current queue number), the priority of the current queue is higher than that of the registered next transmission queue if the registered queue number is less than the final transmission queue number (next transmission queue number<final transmission queue number), since the priority of queue subsequent to the final transmission queue is always higher than that of queue previous to the final transmission queue as shown FIG. 6B.

Accordingly, the above condition (4) (next transmission queue number<final transmission queue number<current queue number) is satisfied if the priority of the current queue is higher than the priority of the registered next transmission queue.

Then, if at least one of the conditions (3) and (4) is satisfied, the next transmission queue is updated with the current queue, and the registered priority is updated with the priority of the current queue (step S5). Then the forwarding table holding the updated next transmission queue number is transferred to the next queue.

On the other hand, if both of the conditions (3) and (4) are not satisfied, the forwarding table is not updated and transferred to the next queue.

The above processing has been performed in each queue, then the arbiter 8 reads the next transmission queue number registered in the forwarding table. Then the arbiter 8 outputs a transmission command for transmission of next data frame to the queue of the read next transmission queue number.

The queue from which a data frame has been newly transmitted the final transmission queue in its queue group. Accordingly, the contents of the second table holding the final transmission queue number must be updated.

Then the arbiter 8 outputs update information to the second table. Then, the scheduler group number registered in the forwarding table, the next transmission queue number and the number of next transmission queue group including the queue are extracted from the update information. In the second table, the final transmission queue number of the queue group to which the next transmission queue belongs is updated by using the extracted three types of number information.

Note that a time lag occurs between the point where the forwarding table generator 6 generates a forwarding table based on the second table and the point where the final transmission queue number is updated in the second table. Accordingly, in some cases, even when a data frame is newly transmitted from a queue, update of the final transmission queue number of queue group of the queue is delayed, thus the continuously-generated plural forwarding tables are not updated.

However, in the long term, the result of execution of queue shaping is fair and the delay of update of final transmission queue is not a serious problem. Further, if the invention is applied to an application sensitive of data transmission delay, it may be arranged such that the minimum guaranteed rate is set for avoiding influence of delayed updating.

In this manner, the forwarding table is sequentially transferred in the queue chain as a group of queues and the processing of determining priority order in pipeline form is performed in each queue.

Accordingly, in the present embodiment, all the queues have the same structure regardless of minimum guaranteed rate and priority, and each queue can accommodate all the traffic.

Further, as the function of determining the priority order is realized by the arbiter 8, the plural round robin function blocks. Accordingly, it is not necessary to reconstruct a queue group belonging to each round robin in correspondence with change of queue usage. As a result, the invention can be applied to various combinations of queue usages.

Further, since the priority order is determined in pipeline form, the algorithms of the respective queues can be simplified. Accordingly, the processing function of determining the priority order can be realized by a simple circuit construction.

Note that in the above-described embodiment, the present invention is implemented under the particular conditions, however, various changes can be made in the present invention. For example, in the above embodiment, upon update of forwarding table, the registered priority is determined prior to the determination of the result of allocation of minimum guaranteed rate, however, the determination may be performed in inverse order.

According to the present invention, the following advantages can be attained. First, it is not necessary to reconstruct each subgroup in correspondence with change of traffic shaping since the forwarding table is sequentially transferred to the respective queues and the next transmission queue is determined, i.e., the forwarding table is processed in pipeline form in the respective queues.

Further, the number of queues can be easily increased since the circuit scale of each queue can be reduced.

While this invention has been described in connection with certain preferred embodiments, it is to be understood that the subject matter encompassed by way of this invention is not limited to those specific embodiments. On the contrary, it is intended for the subject matter of the invention to include all alternative, modification and equivalents as can be included within the spirit and scope of the following claims.

What is claimed is:

1. A data transfer apparatus for determining transmission priorities of data frames transmitted from plural queues, comprising:

a forwarding table generator that generates a forwarding table in which data for determination of said transmission priorities is registered and which is sequentially transferred to said plural queues;

a data update unit that, if a priority of transmission queue to which said forwarding table has been transferred is higher than that of a next transmission queue registered in said forwarding table as a transmission queue from which a data frame is to be transmitted next, updates said next transmission queue with said transmission queue;

a data arbitration unit that causes transmission of data frame from a queue registered as said next transmission queue in the forwarding table which has been transferred through all said plural queues;

means for generating a queue information table for each said queue;

means for providing a flag, indicating data frame transmission possible status or data frame transmission impossible status from said queue, in said queue information table;

means for closing said flag to indicate the transmission possible status, if a data frame is stored in said queue and if a transmission rate of said data frame is lower than a rate set by transmission rate control on said queue; and means for comparing a priority of a transmission possible queue for which said flag indicates a transmission possible status with that of the next transmission queue registered in said forwarding table, wherein each of said plural queues independently updates the forwarding table.

2. A data transfer method for determining transmission priorities of data frames transmitted from plural queues, comprising:

a step of forwarding a forwarding table in which data for determination of said transmission priorities is registered sequentially to said plural queues;

a step of, if a priority of transmission queue to which said forwarding table has been transferred is higher than that of a next transmission queue registered in said forwarding table as a transmission queue from which a data frame is to be transmitted next, updating said next transmission queue with said transmission queue;

a step of causing transmission of data frame from a queue registered as said next transmission queue in the forwarding table which has been transferred through all said plural queues, a step of generating a queue information table for each said queue;

a step of providing a flag, indicating data frame transmission possible status or data frame transmission impossible status from said queue, in said queue information table;

a step of, if a data frame is stored in said queue and if a transmission rate of said data frame is lower than a rate set by transmission rate control on said queue, causing said flag to indicate the transmission possible status; and a step of comparing a priority of a transmission possible queue for which said flag indicates the transmission possible status with that of the next transmission queue registered in said forwarding table, wherein each of said plural queues independently updates the forwarding table.

3. The data transfer method according to claim 2, further comprising:

a step of said dividing plural queues;

a step of dividing queues belonging to said plural groups into subgroups each having the same priority;

a step of performing a first step of transmission rate control of, in a subgroup queue belonging to said subgroup, if a transmission rate of a data frame transmitted from said subgroup queue is higher than a maximum transmission rate (shaping rate) set for a queue having the data frame, limiting transmission of the data frame;

a step of determining said transmission priorities of queues, by using the result of said first step of transmission rate control; and a step of performing a second step of transmission rate control of limiting transmission of data frame from said subgroup by using a rate control circuit (scheduler).

4. The data transfer method according to claim 3, further comprising:

a step of allocating said group to a series of slot numbers in correspondence with distribution of transmission rate in said second step of transmission rate control step in said rate control circuit;

a step of generating said forwarding table one-by-one corresponding to said slot numbers in a circular manner; and a step of, only in a queue belonging to a subgroup allocated to a slot number corresponding to said forwarding table, comparing the priority of a next transmission queue registered in said forwarding table with that of said queue.

5. The data transfer method according to claim 4, further comprising:

a step of registering a group number allocated to said slot number into a first table; and a step of, upon generation of said forwarding table, registering said group number allocated to said slot number in said first table into said forwarding table.

6. The data transfer method according to claim 4, further comprising:

a step of registering a subgroup to which the next transmission queue belongs into said forwarding table; and a step of, if a subgroup of a queue to which said forwarding table has been transferred and the subgroup to which said next transmission queue belongs are the same, comparing the priority of registered next transmission queue with that of said queue.

7. The data transfer method according to claim 5, further comprising:

a step of registering a subgroup to which the next transmission queue belongs into said forwarding table; and a step of, if a subgroup of a queue to which said forwarding table has been transferred and the subgroup to which said next transmission queue belongs are the same, comparing the priority of registered next transmission queue with that of said queue.

8. The data transfer method according to claim 3, further comprising:

a step of registering a minimum guaranteed rate reserved queue among queues belonging to said subgroup into a first table;

a step of, upon generation of said forwarding table, registering the minimum guaranteed rate reserved queue, registered in said first table, into said forwarding table; and a step of, upon comparison of priorities, if a transfer queue to which said forwarding table has been transferred and the minimum guaranteed rate reserved queue correspond with each other, registering a number of the transfer queue as said next transmission queue into said forwarding table.

9. The data transfer method according to claim 3, further comprising:
   a step of allocating serial numbers to respective queues belonging to the same subgroup and sequentially transmitting data frames by an arbiter in the order of said serial numbers;
   a step of registering a serial number of a final transmission queue, from which a data frame has been finally transmitted, among the queues belonging to said subgroup, into a second table;
   a step of, upon generation of said forwarding table, registering serial numbers of final transmission queues of respective subgroups belonging to a group corresponding to said forwarding table, among the serial numbers of final transmission queues registered in said second table, into said forwarding table;
   a step of, if a serial number of the next transmission queue registered in said forwarding table is less than that of said final transmission queue and if the serial number of said final transmission queue is less than that of transmission queue to which said forwarding table has been transferred, updating said next transmission queue with said transmission queue; and
   a step of, if said next transmission queue is updated, updating a serial number of final transmission queue of subgroup of said next transmission queue registered in said second table.

10. A computer readable medium including a program of data transfer method for determining transmission priorities of data frames transmitted from plural queues, executes by a computer:

a step of forwarding a forwarding table in which data for determination of said transmission priorities is registered sequentially to said plural queues;
   a step of, if a priority of transmission queue to which said forwarding table has been transferred is higher than that of a next transmission queue registered in said forwarding table as a transmission queue from which a data frame is to be transmitted next, updating said next transmission queue with said transmission queue;
   a step of causing transmission of data frame from a queue registered as said next transmission queue in the forwarding table which has been transferred through all said plural queues,
   a step of generating a queue information table for each said queue;
   a step of providing a flag, indicating data frame transmission possible status or data frame transmission impossible status from said queue, in said queue information table;
   a step of, if a data frame is stored in said queue and if a transmission rate of said data frame is lower than a rate set by transmission rate control on said queue, causing said flag to indicate the transmission possible status; and
   a step of comparing a priority of a transmission possible queue for which said flag indicates the transmission possible status with that of the next transmission queue registered in said forwarding table,
   wherein each of said plural queues independently updates the forwarding table.

* * * * *